United States Patent
Liu et al.

(10) Patent No.: US 11,951,530 B2
(45) Date of Patent: Apr. 9, 2024

(54) HIGH-STRENGTH STAINLESS STEEL ROTOR AND METHOD FOR PREPARING THE SAME

(71) Applicant: CENTRAL IRON AND STEEL RESEARCH INSTITUTE, Beijing (CN)

(72) Inventors: Zhenbao Liu, Beijing (CN); Jianxiong Liang, Beijing (CN); Xiaohui Wang, Beijing (CN); Yongqing Sun, Beijing (CN); Changjun Wang, Beijing (CN); Zhiyong Yang, Beijing (CN)

(73) Assignee: CENTRAL IRON AND STEEL RESEARCH INSTITUTE, Beijing (CN)

( * ) Notice: Subject to any disclaimer, the term of this patent is extended or adjusted under 35 U.S.C. 154(b) by 198 days.

(21) Appl. No.: 17/638,179

(22) PCT Filed: Apr. 29, 2021

(86) PCT No.: PCT/CN2021/090831
§ 371 (c)(1),
(2) Date: Feb. 24, 2022

(87) PCT Pub. No.: WO2021/219056
PCT Pub. Date: Nov. 4, 2021

(65) Prior Publication Data
US 2022/0331856 A1    Oct. 20, 2022

(30) Foreign Application Priority Data
Apr. 29, 2020   (CN) .......................... 202010357799.5

(51) Int. Cl.
*B21J 5/00* (2006.01)
*B21J 5/02* (2006.01)
(Continued)

(52) U.S. Cl.
CPC ................. *B21J 5/002* (2013.01); *B21J 5/02* (2013.01); *C21D 9/0081* (2013.01); *C22C 38/04* (2013.01);
(Continued)

(58) Field of Classification Search
CPC ................. B21J 5/002; B21J 5/02; B21J 1/06
See application file for complete search history.

(56) References Cited

U.S. PATENT DOCUMENTS

| | | | | |
|---|---|---|---|---|
| 2005/0247386 A1* | 11/2005 | Matera | ..................... | C22C 19/07 148/668 |
| 2014/0366604 A1* | 12/2014 | Miura | ..................... | C22C 21/10 72/361 |
| 2019/0381559 A1* | 12/2019 | Schloffer | ................ | C22C 14/00 |

FOREIGN PATENT DOCUMENTS

| | | | |
|---|---|---|---|
| CN | 105138686 A | | 12/2015 |
| CN | 105522087 A | * | 4/2016 |

(Continued)

OTHER PUBLICATIONS

Machine translation of CN-106544600-A (Year: 2017).*
(Continued)

*Primary Examiner* — Kyle A Cook
(74) *Attorney, Agent, or Firm* — Bochner PLLC; Andrew D. Bochner

(57) ABSTRACT

A high-strength stainless steel rotor and a method for preparing the same, are provided. The high-strength stainless steel rotor, including the following element components by mass percentage: C: 0.03-0.050%, Cr: 14.90-15.80%, Ni: 5.00-5.70%, Cu: 2.20-2.80%, (Nb+Ta): 0.35-0.44%, Mo: 0.45-0.54%, V: 0.06-0.10%, Si: 0.20-0.60%, Mn: 0.40-0.80%, P≤0.010%, S≤0.010%, O≤0.003%, and the balance of iron and inevitable impurities.

14 Claims, 3 Drawing Sheets

(51) Int. Cl.
*C21D 9/00* (2006.01)
*C22C 38/04* (2006.01)
*C22C 38/42* (2006.01)
*C22C 38/44* (2006.01)
*C22C 38/46* (2006.01)
*C22C 38/48* (2006.01)
*G01C 19/06* (2006.01)

(52) U.S. Cl.
CPC .............. *C22C 38/42* (2013.01); *C22C 38/44* (2013.01); *C22C 38/46* (2013.01); *C22C 38/48* (2013.01); *G01C 19/06* (2013.01)

(56) References Cited

FOREIGN PATENT DOCUMENTS

| CN | 106544600 A | | 3/2017 |
|---|---|---|---|
| CN | 106623711 A | * | 5/2017 |
| CN | 110090910 A | * | 8/2019 |
| CN | 110125317 A | | 8/2019 |
| CN | 111471940 A | | 7/2020 |

OTHER PUBLICATIONS

Machine translation of CN-105522087-A (Year: 2016).*
Machine translation of CN-106623711-A (Year: 2017).*
Don Susan et al., Sandia National Laboratories, The Effects of Annealing Treatments on AM 316L Stainless Steel, Published Oct. 25, 2018 (Year: 2018).*
MetalShims.com, 410 Stainless Steel Technical Data Sheet, Screen shot taken on Mar. 19, 2019 (Year: 2019).*
MEADinfo, Surface Roughness Produced by Different Manufacturing Process, Published Jun. 30, 2009, available at https://www.meadinfo.org/2009/06/surface-finish-roughness-ra.html (Year: 2009).*
Machine translation of CN-110090910-A (Year: 2019).*
Uo Hengjun et al., Trail Manufacture of 15-5PH Precipitation Hardened Stainless Steel Die Forging, published Mar. 2014, 2 pages.

* cited by examiner

HIGH-STRENGTH STAINLESS STEEL ROTOR AND METHOD FOR PREPARING THE SAME

CROSS REFERENCE TO RELATED APPLICATION

The present application claims priority to the Chinese Patent Application No. 202010357799.5, entitled "HIGH-STRENGTH STAINLESS STEEL ROTOR AND METHOD FOR PREPARING THE SAME", and filed with the China National Intellectual Property Administration on Apr. 29, 2020, which is incorporated herein by reference in its entirety.

TECHNICAL FIELD

The present disclosure relates to the technical field of metal material thermal processing, and in particular to a high-strength stainless steel rotor and a method for preparing the same.

BACKGROUND ART

High-strength stainless steel with high toughness and corrosion resistance is an excellent structural material, and it is widely used in fields such as petroleum, chemical, civil ship, aerospace, and civil aircraft. At present, forgings of the high-strength stainless steel are widely used, and there are corresponding researches on forging processes.

High-speed rotor is an important part of a gyroscope. The high-strength stainless steel could achieve relatively desirable service performance in the manufacture of the high-speed rotor due to its advantages of high strength, high toughness, high dimensional stability and corrosion resistance. In the prior art, the high-speed rotor is prepared by cutting a bar stock obtained through free forging using a 1Cr18Ni9Ti stainless steel. However, in this method, a relatively large number of the bar stocks are cut, which greatly wastes raw materials and increases costs. Meanwhile, the rotor machined by a bar machining machine has un-tight metal stream lines, which will cause safety hazard during use. In addition, the rotor made of 1Cr18Ni9Ti stainless steel has a relatively low strength of only 560 MPa, leading to a short service life.

SUMMARY

In view of the above analysis, the present disclosure aims to provide a high-strength stainless steel rotor and a method for preparing the same, to solve problems in the prior art of low strength and short service life of a rotor, vast waste of raw materials during a cutting process of a forging.

The object of the present disclosure is achieved by the following technical solutions:

A high-strength stainless steel rotor, including the following element components by mass percentage: C: 0.03-0.050%, Cr: 14.90-15.80%, Ni: 5.00-5.70%, Cu: 2.20-2.80%, (Nb+Ta): 0.35-0.44%, Mo: 0.45-0.54%, V: 0.06-0.10%, Si: 0.20-0.60%, Mn: 0.40-0.80%, P≤0.010%, S≤0.010%, O≤0.003%, and the balance of iron and inevitable impurities.

In some embodiments, the high-strength stainless steel rotor may include the following element components by mass percentage: C: 0.043%, Cr: 15.4%, Ni: 5.35%, Cu: 2.52%, (Nb+Ta): 0.41%, Mo: 0.53%, V: 0.08%, Si: 0.25%, Mn: 0.46%, P: 0.005%, S≤0.010%, O≤0.003%, and the balance of iron and inevitable impurities.

A method for preparing the above high-strength stainless steel rotor, including the following steps:

step 1: preparing a rotor stainless steel billet;

step 2: subjecting the rotor stainless steel billet to a first heating and a free forging, and then a first annealing and a surface treatment to obtain a forged billet;

step 3: subjecting the forged billet to a second heating, a die forging, and then a second annealing and a solution treatment to obtain a forging; and step 4: subjecting the forging to a rough machining, an aging treatment and a finish machining to obtain the high-strength stainless steel rotor.

In some embodiments, in step 1, the rotor stainless steel billet may have a length of 450-480 mm and a diameter φ of 350 mm.

In some embodiments, in step 2, the first heating may specifically include:

heating a gas furnace to a temperature of 750° C., charging the rotor stainless steel billet into the gas furnace, holding for 1.5-2 h, further heating to a temperature of 1,140-1,170° C. at a heating rate of 200-300° C./h, and holding for 2-3 h.

In some embodiments, in step 2, the free forging may include two upsettings and one drawing out, and be specifically conducted as follows:

subjecting the rotor stainless steel billet to a first upsetting to a diameter φ of 440-460 mm, a drawing out to a diameter φ of 350-380 mm, and then a second upsetting to a diameter φ of 440-460 mm, in which the free forging may have an initial forging temperature of 1,140-1,170° C. and a finish forging temperature of not less than 900° C.; and cooling the rotor stainless steel billet after the free forging in heap to a temperature of 300° C., dispersing and air-cooling to ambient temperature.

In some embodiments, in step 2, the first annealing may specifically include:

placing the rotor stainless steel billet after the free forging into a resistance furnace, heating to a temperature of 640-660° C., holding for 12-20 h, and cooling to ambient temperature along with the furnace to obtain the forged billet.

In some embodiments, in step 3, the second heating may specifically include:

heating a gas furnace to a temperature of 750° C., charging the forged billet into the gas furnace, holding for 1.5-3 h, further heating to a temperature of 1,120-1,150° C. at a heating rate of 100-150° C./h, and holding for 1-2 h.

In some embodiments, in step 3, the die forging may specifically include:

placing the forged billet after the second heating into a die forging machine for die forging with an initial forging temperature of 1,120-1,140° C. and a finish forging temperature of not less than 900° C., and then air-cooling the forged billet after the die forging to ambient temperature.

In some embodiments, the die forging may be conducted by a means of pressing deformation on the forged billet with a lower die for 5 times, and the 5 times of pressing deformation may be conducted as follows:

a first pressing deformation is conducted by pressing the forged billet using an upper die with a pressure of 2,000-3,000 tons;

a second pressing deformation and a third pressing deformation are conducted by pressing the forged billet using the upper die with a pressure of not less than 5,000 tons;

a fourth pressing deformation is conducted by pressing the forged billet with a pressure of 4,500 tons; and a fifth pressing deformation is conducted by pressing the forged billet with a pressure of 4,000 tons for 30-40 s.

In some embodiments, the forged billet obtained after the die forging may have a thickness pressed from 280 mm to 100-120 mm and a forging ratio of more than 2.

In some embodiments, in step 3, the second annealing may specifically include:

placing the forged billet after the die forging into a resistance furnace, heating to a temperature of 640-660° C., holding for 25-30 h, and cooling to ambient temperature along with the furnace.

In some embodiments, in step 3, the solution treatment may specifically include:

placing the forged billet after the second annealing into a resistance furnace, heating to a temperature of 1,035-1,045° C., holding for 1-1.5 h, and air-cooling to a temperature of not more than 32° C. to obtain the forging.

In some embodiments, in step 4, the aging treatment may specifically include:

placing the forging after the rough machining into a resistance furnace, heating to a temperature of 550-560° C., holding for 4-4.5 h, and air-cooling to ambient temperature.

In some embodiments, the high-strength stainless steel rotor obtained after the finish machining may have a surface roughness reaching Ra1.6.

Compared with the prior art, the present disclosure has at least one of the following beneficial effects:

1. In the present disclosure, a rotor is prepared by subjecting a high-strength stainless steel material to a combination of a free forging and a die forging, to a heating before the free forging and the die forging and then to an annealing after the free forging and the die forging, and after the last annealing, subjecting the obtained forgings to a solution treatment, a rough machining, an aging treatment and a finish machining. The obtained rotor has a tensile intensity $R_m$ of not less than 1,100 MPa, a yield intensity $Rp_{0.2}$ of not less than 1,000 MPa, an elongation after fracture A of not less than 15%, a section shrinkage Z of not less than 55% and a hardness of not less than 36 HRC. Compared with existing rotors, the rotor in the present disclosure has a strength increased by not less than 500 MPa, resulting in an improved service life.

2. The present disclosure provides a preparation process of conducting a free forging and a die forging sequentially, in which the free forging has a forging ratio of more than 3, the die forging has a forging ratio of more than 2, and a cumulative forging ratio of the free forging and the die forging is more than 5. There is a large amount of deformation in both transverse and longitudinal directions, austenite has a small grain size (not less than level 6), indicating that grains are relatively greatly broken. Therefore, the forgings have consistent horizontal and longitudinal mechanical properties, which improves the fatigue life of high-speed rotating parts of the rotor, thereby enhancing the safety and reliability.

3. In the present disclosure, the free forging of the billet includes two upsettings and one drawing out. The billet is subjected to a first upsetting to a diameter φ of 440-460 mm, a drawing out to a diameter φ of 350-380 mm, and then a second upsetting to a diameter φ of 440-460 mm. The billet after two upsettings and one drawing out is subjected to a free forging. The free forging of the billet has an initial forging temperature of 1,140-1,170° C., preferably 1,140-1,150° C. The two upsettings and one drawing out of the free forging aim to produce a larger amount of deformation on the billet to obtain grains with relatively small size and uniform grain size in horizontal and longitudinal directions.

4. In the present disclosure, a first annealing after the free forging and a second annealing after the die forging are adopted. During the forging, the temperature is strictly controlled as follows: the free forging has an initial forging temperature of 1,140-1,170° C. and a finish forging temperature of not less than 900° C., the die forging has an initial forging temperature of 1,120-1,140° C. and a finish forging temperature of not less than 900° C. The forged billet under this temperature has desirable thermoplasticity. The amount of deformation and the deformation size each time are controlled to facilitate deformation, ensuring the plasticity of materials during the forging, and obtaining a relatively large forging ratio without defects such as cracks.

5. In the present disclosure, conducting a rough machining on the forgings after a solution treatment could reduce tool wear and leave a small finish machining allowance, and conducting a finish machining after an aging treatment could reduce tool wear due to the increase in material hardness.

6. In the present disclosure, a closed metal stream line along the shape of the forging could be obtained by adopting a combination of a free forging and a die forging. The prepared rotor has an integrally closed metal stream line, which improves the fatigue resistance and use safety, resulting in that the rotor is suitable for service life of more than 10 years.

7. In the present disclosure, the forgings have a small cutting amount, which saves the amount of raw materials and effectively reduces the cost, thereby avoiding the problems of a large amount of processing and waste of raw materials present in the conventional technology in which bars is directly cut and processed into forgings. In addition, the rotor product has desirable consistency and a qualified rate reaching 100%.

The above technical solutions in the present disclosure could also be combined with each other to realize more preferred combined solutions thereof. Other features and advantages of the present disclosure will be described in the following description, and some of these will become apparent from the description or be understood by implementing the present disclosure. The objects and other advantages of the present disclosure may be implemented or derived by those specifically indicated in the description and accompanying drawings.

BRIEF DESCRIPTION OF THE DRAWINGS

The accompanying drawings are provided merely for illustrating the specific embodiments, rather than limiting the present disclosure. The same reference numerals represent the same components throughout the accompanying drawings.

DETAILED DESCRIPTION OF THE EMBODIMENTS

Figure 1:
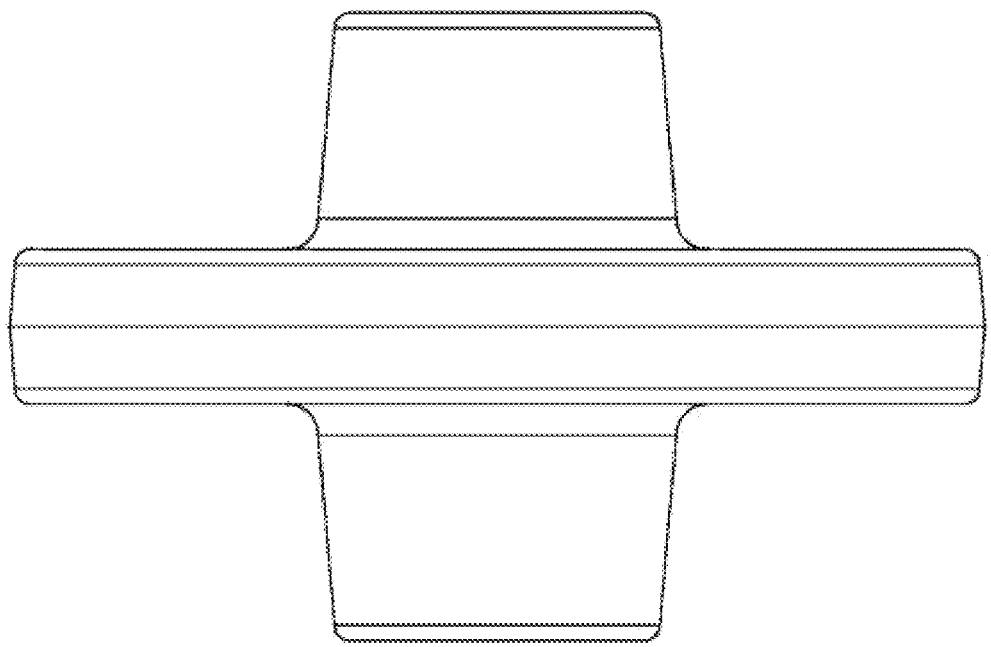
FIG. 1 is a schematic diagram of a die forging of a rotor.
Figure 2:
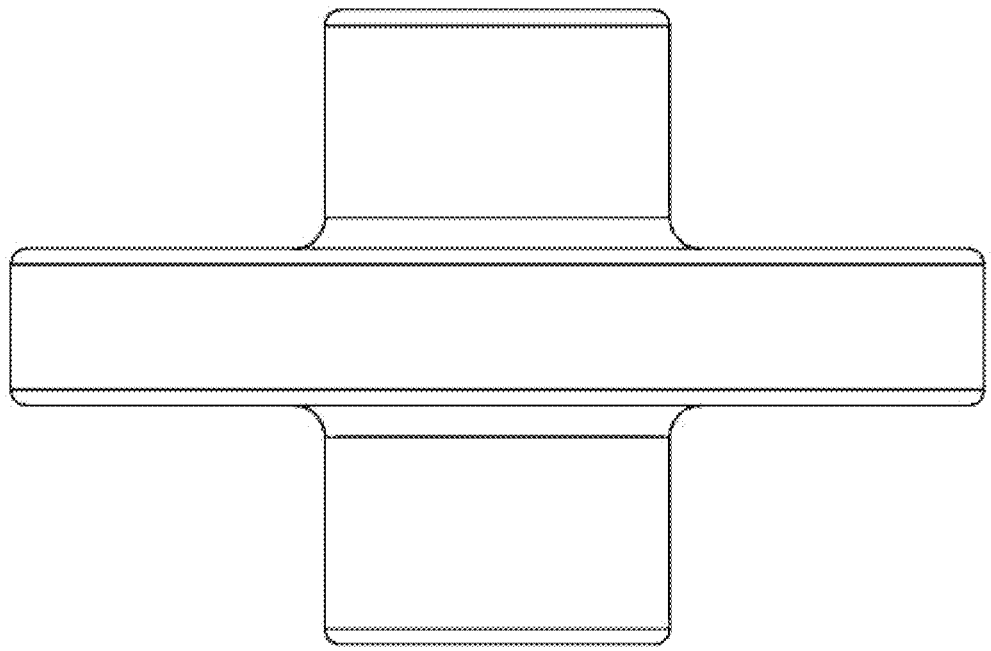
FIG. 2 is a schematic diagram of a rotor.

Preferred embodiments of the present disclosure are described in detail below with reference to the accompanying drawings. The accompanying drawings constitute a part of the present disclosure, and are used together with the embodiments of the present disclosure to explain the principles of the present disclosure, rather than to limit the scope of the present disclosure.

A specific embodiment of the present disclosure provides a high-strength stainless steel rotor, including the following element components by mass percentage: C: 0.03-0.050%, Cr: 14.90-15.80%, Ni: 5.00-5.70%, Cu: 2.20-2.80%, (Nb+Ta): 0.35-0.44%, Mo: 0.45-0.54%, V: 0.06-0.10%, Si: 0.20-0.60%, Mn: 0.40-0.80%, P≤0.010%, S≤0.010%, O≤0.003%, and the balance of iron and inevitable impurities.

To obtain a high-strength rotor, 5.00-5.70% of Ni is added to obtain a martensitic structure, a strengthening element Cu (2.20-2.80%) is added to precipitate a second phase ε-Cu, Nb is added to obtain an NbC precipitated phase, and the addition of Mo has a solid solution strengthening effect. To ensure fatigue performance, P and S are reduced to an amount not more than 0.01%. To reduce the content of oxide inclusions and improve fatigue performance, O is reduced to not more than 0.003%. To improve the corrosion resistance of the rotor, Cr element has an alloy ratio of 14.90-15.80%.

The present disclosure further provides a method for preparing a high-strength stainless steel rotor, including the following steps.

Step 1, a rotor stainless steel billet is prepared.

Step 2, the rotor stainless steel billet is subjected to a first heating and a free forging, and then a first annealing and a surface treatment to obtain a forged billet.

The first heating specifically includes: heating a gas furnace to a temperature of 750° C., charging the rotor stainless steel billet into the gas furnace, holding for 1.5-2 h, heating to a temperature of 1,140-1,170° C. at a heating rate of 200-300° C./h, and holding for 2-3 h. The free forging includes two upsettings and one drawing out, and is specifically conducted as follows: subjecting the rotor stainless steel billet to a first upsetting to a diameter φ of 440-460 mm, a drawing out to a diameter φ of 350-380 mm, and then a second upsetting to a diameter φ of 440-460 mm, in which the free forging has an initial forging temperature of 1,140-1,170° C. and a finish forging temperature of not less than 900° C., and cooling the rotor stainless steel billet after the free forging in heap to a temperature of 300° C., dispersing and air-cooling to ambient temperature. The first annealing specifically includes: placing the rotor stainless steel billet after the free forging into a resistance furnace, heating to a temperature of 640-660° C., holding for 12-20 h, and cooling to ambient temperature along with the furnace to obtain the forged billet.

Step 3, the forged billet is subjected to a second heating, a die forging, and then a second annealing and a solution treatment to obtain a forging.

The second heating specifically includes: heating a gas furnace to a temperature of 750° C., charging the forged billet into the gas furnace, holding for 1.5-3 h, further heating to a temperature of 1,120-1,150° C. at a heating rate of 100-150° C./h, and holding for 1-2 h. The die forging specifically includes: placing the forged billet after the second heating into a die forging machine for the die forging with an initial forging temperature of 1,120-1,140° C. and a finish forging temperature of not less than 900° C., and air-cooling a forged billet after the die forging to ambient temperature. The second annealing specifically includes: placing the forged billet after the die forging into a resistance furnace, heating to a temperature of 640-660° C., holding for 25-30 h, and cooling to ambient temperature along with the furnace. The solution treatment specifically includes: placing the forged billet after the second annealing into a resistance furnace, heating to a temperature of 1,035-1,045° C., holding for 1-1.5 h, and air-cooling to a temperature of not more than 32° C. to obtain the forging.

Step 4, the forging is subjected to a rough machining, an aging treatment and a finish machining to obtain the high-strength stainless steel rotor.

The aging treatment specifically includes: placing the forging after the rough machining into a resistance furnace, heating to a temperature of 550-560° C., holding for 4-4.5 h, and air-cooling to ambient temperature to obtain the rotor.

Specifically, in step 1, a high-strength stainless steel bar stock with a diameter φ of 350 mm is prepared, cut into a billet with a length of 450-480 mm, and surface burrs are removed. To alleviate stress concentration at edges and corners in the subsequent forging processes and eliminate potential safety hazards, edges of two end faces of the billet are rounded to R20.

Step 2 specifically includes the following steps.

Step 21, the billet is subjected to a first heating in a gas furnace.

The first heating specifically includes: heating the gas furnace to a temperature of 750-760° C., charging the billet into the gas furnace, holding for 1.5-2 h, further heating to a temperature of 1,140-1,170° C. at a heating rate of 200-300° C./h, and holding for 2-3 h. The billet is charged into the furnace with a temperature of 750-760° C., which enables the billet to quickly pass through a brittle temperature range of 400-470° C., reducing the brittleness. If the billet is held at 400-470° C. for a long time, a strengthening phase will be precipitated in the structure, thus increasing the tendency of the material to crack due to the influence of internal thermal stress.

Compared with a heating rate of the gas furnace in the prior art at 100° C./h, the billet in the present disclosure is quickly heated to a temperature of 1,140-1,170° C. at a heating rate of 200-300° C./h, thus shortening the heating time, reducing energy consumption and improving production efficiency. In addition, shortening the heating rate could also inhibit the growth of austenite grains of the stainless steel billet at high temperatures to increase the strength of the billet and reduce the plasticity thereof. The billet is held at a temperature of 1,140-1,170° C. for 2-3 h to ensure the uniformity of the temperature and structure of the billet before forging.

Step 22, the billet is subjected to a free forging.

The free forging of the billet includes two upsettings and one drawing out. The billet is subjected to a first upsetting to a diameter φ of 440-460 mm, a drawing out to a diameter φ of 350-380 mm, and then a second upsetting to a diameter φ of 440-460 mm. The billet after two upsettings and one drawing out is subjected to a free forging. The free forging of the billet is conducted with an initial forging temperature of 1,140-1,170° C., preferably 1,140-1,150° C. The two upsettings and one drawing out aim to produce a larger amount of deformation on the billet to obtain grains with relatively small size and uniform grain size in horizontal and longitudinal directions for subsequent die forging.

In the prior art, the bar stock is directly machined into a rotor without deformation and forging ratio. In the present disclosure, the bar stock is forged to obtain a relatively large forging ratio. The free forging has a forging ratio of more than 3, which makes the grains violently deformed, resulting in that accumulated energy could form new grain nucleation cores at the boundaries of deformed grains, and recrystallization occurs to form small and uniform equiaxed grains.

In addition, to ensure that the billet is fully deformed and the grains are broken to be fine while ensuring that the billet does not crack during the forging, the finish forging temperature in the present disclosure is more than 900° C. After the free forging, the forged billet is cooled in heap to 300° C., dispersed and air-cooled, which mainly aims to prevent cracks caused by uneven thermal stress on the core and surface of the forged billet due to excessive cooling speed. The billet is subjected to the free forging to obtain a forged billet.

Step 23, the billet is subjected to a first annealing.

The forged billet is placed into a resistance furnace, heated to a temperature of 640-660° C., preferably 640-650° C., and held for 12-20 h, preferably 12-15 h. The first annealing is to eliminate structural defects caused by uneven forging deformation, reduce dislocation density between the grains of the forgings, thereby making the structure uniform and eliminating residual stress.

In the prior art, the billet has an annealing temperature of 620-640° C., or is not subjected to annealing treatment. Compared with the annealing temperature of 620-640° C. in the prior art, the annealing treatment of the present disclosure is conducted at a higher annealing temperature range due to a large forging ratio, a large deformation and a large internal stress in the forged billet during free forging, and the internal stress could be eliminated by the higher annealing temperature.

Step 24, the billet after annealing is subjected to a surface treatment to obtain the forged billet.

In the surface treatment of the forgings, surface oxide scales of the forged billet after forging are removed using a shot blasting machine, and surface defects of the forgings are polished. The surface treatment is to prevent defects such as surface cracks from entering the part during subsequent die forging, or prevent continued cracking from reducing the yield and affecting the performance of the forgings.

Step 3 specifically includes the following steps.

Step 31, the forged billet after the surface treatment is subjected to a second heating.

The second heating is to heat the forged billet after the surface treatment to prepare for a die forging. The second heating specifically includes: heating a gas furnace to a temperature of 750-780° C., charging the forged billet into the gas furnace, holding for 1.5-3 h, further heating to a temperature of 1,120-1,150° C. at a heating rate of 100-150° C./h, and holding for 1-2 h. The forged billet is charged into the furnace with a temperature of 750-780° C., which allows the forged billet to quickly pass through the brittle temperature range of 400-470° C. If being held at the brittle temperature for a long time, the structure will precipitate precipitation strengthening phase, which greatly increases the tendency of material cracking due to the influence of internal thermal stress. Heating to a temperature of 1,120-1,150° C. at a heating rate of 100-150° C./h, preferably 120-150° C./h could make the temperature from the surface to the core of the forged billet more uniform during the heating with a small temperature gradient. Holding at a temperature of 1,120-1,150° C. for 1-2 h could reduce energy consumption, inhibit the growth of austenite grains at high temperature and ensure the uniformity of material structure.

In particular, the two heatings are conducted at different heating rates. The first heating is conducted before the free forging, and at a faster heating rate; while the second heating is conducted for the die forging to make the temperatures inside and outside the forged billet consistent, and thus it is conducted at a slower heating rate. In addition, the first heating rate is fast to shorten the heating time, because excessive heating time will lead to grains growing up. The second heating rate is slow, because excessive heating rate will lead to a large temperature gradient inside and outside, forming thermal stress, thereby resulting in deterioration of thermal plasticity, and thus affecting forging deformation.

Step 32, the forged billet after the second heating is subjected to a die forging.

The die forging has an initial forging temperature of 1,120-1,140° C., preferably 1,120-1,130° C. to obtain a forged billet with desirable thermoplasticity, which is conducive to deformation. The die forging has a finish forging temperature of more than 900° C. To avoid stress concentration at edges and corners during the die forging, the finish forging temperature is as high as possible; meanwhile, considering that the grains are sufficiently broken to obtain fine grains, the finish forging temperature is preferably more than 950° C. The forged billet obtained after the die forging is air-cooled to ambient temperature to obtain a forging.

The die forging is conducted by pressing deformation on the forged billet with a lower die for 5 times. The forged billet after the second heating is placed into a cavity of a lower die of a die forging machine using a manipulator, and the forged billet is adjusted to make an axis thereof align with an axis of the die to avoid eccentricity during the forging. A first pressing deformation is conducted by pressing the forged billet using an upper die with a pressure of 2,000-3,000 tons, ensuring that the forged billet is centered and fixed in the cavity of the lower die. A second and a third pressing deformations are conducted by pressing the forged billet using the upper die with a pressure of not less than 5,000 tons, which could obtain a relatively large forging ratio and thoroughly break the grains. A fourth pressing deformation is conducted by pressing the forged billet with a pressure of 4,500 tons, which could make the forged billet filled the upper and lower die cavities. A fifth pressing deformation is conducted by pressing the forged billet with a pressure of 4,000 tons for 30-40 s in a fifth pressing deformation, which allows the forged billet to further fill the upper and lower die cavities, and meanwhile holding for 30-40 s in the cavities could release the stress at the edges and corners, and make the temperature and structure of the forged billet more uniform inside and outside, as well as ensure the external dimensions meet requirements. After the die forging, the obtained forged billet has a thickness pressed from 280 mm to 100-120 mm and a forging ratio of more than 2, and fully fills the cavity of the die. A forging similar in shape to the high-speed rotor is obtained by the die forging, which reduces the amount of subsequent processing, and ensures large deformations in both horizontal and longitudinal directions and material properties to be consistent in all directions.

Step 33, the forged billet after the die forging is subjected to a second annealing.

The forged billet after the die forging is placed into a resistance furnace, heated to a temperature of 640-660° C., preferably 640-650° C., and held for 25-30 h, and then cooled to ambient temperature along with the furnace. The second annealing could eliminate the structural defects of the die forgings, and further reduce the dislocation density between grains to make the structure uniform and eliminate residual stress.

Step 34, the forged billet after the second annealing is subjected to a solution treatment to obtain the forging.

The solution treatment is to dissolve alloy elements or precipitated phases into a high-temperature austenite to prepare for the dispersion and precipitation of precipitated phases in the aging treatment, and could make the structure more uniform. Therefore, during solution treatment, the forged billet after the die forging is heated in a resistance furnace to a solid solution temperature of 1,035-1,045° C., preferably 1,040° C., held for 1-1.5 h, preferably 1 h, and then air-cooled to a temperature of not more than 32° C. to complete the martensite transformation and ensure a higher strength steel.

Step 4 specifically includes the following steps.

Step 41, the forging is subjected to a rough machining. Specifically, the forging is subjected to a rough machining with a milling machine and a lathe, leaving a finish machining allowance of 1-1.5 mm.

Step 42, the forging after the rough machining is subjected to an aging treatment. Specifically, the forging after the rough machining is placed into a resistance furnace, heated to a temperature of 550-560° C., preferably 550° C., held for 4-4.5 h, preferably 4 h, and air-cooled to ambient temperature. By the aging treatment, a large number of fine and dispersed strengthening phases rich in Cu and Nb(CN) could be precipitated in the steel, which greatly improves the strength of the steel to meet the requirements of mechanical properties.

Step 43, the forging after the aging treatment is subjected to a finish machining to obtain the product. Specifically, the forging after the aging treatment is subjected to a finish machining using a machine tool to meet the final surface roughness of Ra1.6 and the size requirements. The forging is in a gyro shape, as shown in FIG. 1.

Example 1

This example provided a high-strength stainless steel rotor, consisting of the following element components by mass percentage: C: 0.043%, Cr: 15.4%, Ni: 5.35%, Cu: 2.52%, (Nb+Ta): 0.41%, Mo: 0.53%, V: 0.08%, Si: 0.25%, Mn: 0.46%, P: 0.005%, S≤0.010%, O≤0.003%, and the balance of iron and inevitable impurities.

In another aspect, this example provides a method for preparing the high-strength stainless steel rotor, consisting of the following steps.

Step 1, a rotor stainless steel billet was prepared.

A high-strength stainless steel billet with a diameter φ of 350-465 mm was prepared, surface burrs were removed, and edges of two end faces of the billet were rounded to R20.

Step 2, the billet was subjected to a first heating and a free forging, and then a first annealing and a surface treatment, obtaining a forged billet.

Step 21: the billet was subjected to a first heating in a gas furnace.

A gas furnace was heated to a temperature of 750° C., the billet was charged into the gas furnace, held for 1.5 h, further heated to a temperature of 1140° C. at a heating rate of 250° C./h, and held for 2.5 h.

Step 22, the billet was subjected to a free forging.

The billet was placed into a 1,000-ton quick forging machine for a first upsetting to a diameter φ of 450 mm and a height of about 280 mm, a drawing out to a diameter φ of 3650 mm and a height of about 440 mm, and then a second upsetting to a diameter φ of 450 mm and a height of 280 mm, with an initial forging temperature of 1140° C. and a finish forging temperature of 950° C., and a forging ratio of about 4.5. The forged billet after the forging was cooled in heap to a temperature of 300° C., dispersed and air-cooled.

Step 23, the billet after the free forging was subjected to a first annealing and a surface treatment, obtaining a forged billet.

The billet after the free forging was placed into a resistance furnace, heated to a temperature of 640° C., held for 12 h, and cooled to ambient temperature along the furnace. The billet after the free forging was cleaned with a shot blasting machine to remove surface oxide scales, and polished to remove surface defects thereof.

Step 3, the forged billet was subjected to a second heating, a die forging, and then a second annealing and a solution treatment, obtaining a forging.

Step 31, the forged billet was subjected to the second heating.

A gas furnace was heated to a temperature of 750° C., the forged billet was charged into the gas furnace, held for 2 h, further heated to a temperature of 1,130° C. at a heating rate of 150° C./h, and held for 1 h.

Step 32, the forged billet after the second heating was subjected to the die forging.

The forged billet after the second heating was placed into a 6,000-ton die forging machine for the die forging, in which a first pressing deformation was conducted by pressing the forged billet using an upper die with a pressure of 3,000 tons, ensuring that the forged billet was centered and fixed in the cavity of the lower die, a second and third pressing deformations were conducted by pressing the forged billet using the upper die with a pressure of 5,300 tons, a fourth pressing deformation was conducted by pressing the forged billet with a pressure of 4,500 tons to make the forged billet filled the cavities of the upper and lower dies, and a fifth pressing deformation was conducted by pressing the forged billet with a pressure of 4,000 tons for 30 s. The obtained forged billet had a thickness pressed from 280 mm to 105 mm, making the forged billet fully filled the cavities of the upper and lower dies. The die forging had an initial forging temperature of 1,120° C. and a finish forging temperature of 950° C. After the forging, the forged billet was air-cooled to ambient temperature.

Step 33, the forged billet after the die forging was subjected to the second annealing.

The forged billet after the die forging was placed into a resistance furnace, heated to a temperature of 640° C., held for 25 h, and cooled to ambient temperature along with the furnace.

Step 34, the forged billet after the second annealing was subjected to the solution treatment, obtaining the forging.

The forged billet after the second annealing was placed into a resistance furnace, heated to a temperature of 1,040° C., held for 1 h, and air-cooled to a temperature of not more than 32° C., obtaining the forging.

Step 4, the forging was subjected to a rough machining, an aging treatment and a finish machining, obtaining the high-strength stainless steel rotor.

Step 41, the forging was subjected to a rough machining.

The forging was subjected to the rough machining with a milling machine and a lathe, leaving a finish machining allowance of 1 mm.

Step 42, the forging was subjected to the aging treatment.

The forging after the rough machining was placed into a resistance furnace, heated to a temperature of 550° C., held for 4 h, and air-cooled to ambient temperature.

Step 43, the forging after the aging treatment was subjected to the finish machining.

The forging after the aging treatment was subjected to the finish machining using a machine tool to meet the final surface roughness of Ra1.6 and the size requirements. The die forging was in a gyro shape, as shown in FIG. 1.

Example 2

The method was the same as that described in Example 1, except that the free forging had an initial forging temperature of 1,150° C. and a finish forging temperature of 900° C., the forged billet after the free forging was cooled in heap to a temperature of 300° C., dispersed and air-cooled to ambient temperature. The mechanical properties are shown in Table 1.

Example 3

The method was the same as that described in Example 1, except that in the die forging, the first pressing deformation was conducted by pressing the forged billet using an upper die with a pressure of 3,000 tons, ensuring that the forged billet was centered and fixed in the cavity of the lower die, the second and third pressing deformations were conducted by pressing the forged billet using the upper die with a pressure of 5,500 tons, the fourth pressing deformation was conducted by pressing the forged billet with a pressure of 4,500 tons to make the forged billet filled the cavities of the upper and lower die, and the fifth pressing deformation was conducted by pressing the forged billet with a pressure of 4,000 tons for 40 s. The obtained forged billet had a thickness pressed from 280 mm to 120 mm, making the forged billet fully filled the cavities of the upper and lower dies. The die forging had an initial forging temperature of 1,140° C. and a finish forging temperature of 950° C. After the forging, the forged billet was air-cooled to ambient temperature. The mechanical properties are shown in Table 1.

Example 4

The method was the same as that described in Example 1, except that the forged billet after the second annealing was placed into a resistance furnace, heated to a temperature of 1,035° C., held for 1 h, and air-cooled to a temperature of not more than 32° C. The mechanical properties are shown in Table 1.

Example 5

The method was the same as that described in Example 1, except that the aging treatment was conducted as follows: the forging after the rough machining was placed into a resistance furnace, heated to a temperature of 560° C., held for 4 h, and air-cooled to ambient temperature. The mechanical properties are shown in Table 1.

Comparative Example 1

Figure 5:
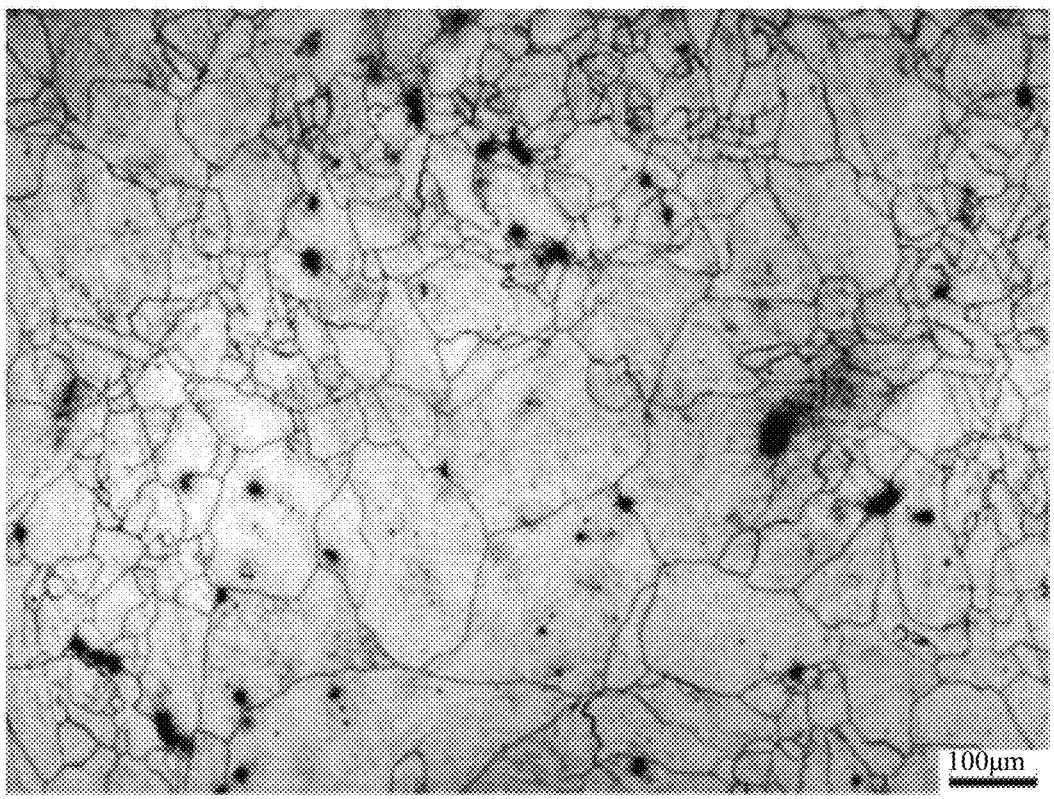
FIG. 5 shows the grain size of the core of the high-speed rotor in Comparative Example 1.

The method for preparing a rotor was the same as that described in Example 1, except that during the die forging, the obtained forged billet had a thickness pressed from 280 mm to 150 mm. The mechanical properties are shown in Table 1, and the coarse and mixed grains are shown in FIG. 5. An average grain size of the metal was measured according to a method described in GB/T 6394.

Comparative Example 2

The method for preparing the rotor was the same as that described in Example 1, except that the aging treatment was conducted as follows: the forging after the rough machining was placed into a resistance furnace, heated to a temperature of 540° C., held for 4 h, and air-cooled to ambient temperature. The mechanical properties are shown in Table 1.

Ambient temperature mechanical properties of high-speed rotors measured practically are listed in Table 1, which are measured in accordance with the standard GB/T228.

TABLE 1

Results of ambient temperature mechanical properties and grain size of rotors in Examples 1-5 and Comparative Examples 1-2.

| Example | Sampling direction | Tensile intensity $R_m$ (MPa) | Yield intensity $R_{p0.2}$ (MPa) | Elongation A (%) | Section shrinkage Z (%) | Hardness (HCR) | Grain size (level) |
|---|---|---|---|---|---|---|---|
| Example 1 | Longitudinal | 1,190 | 1,100 | 16.5 | 60 | 38.9 | 6.5 |
|  | Transverse | 1,210 | 1,090 | 16.0 | 62 | 38.7 |  |
| Example 2 | Longitudinal | 1,180 | 1,080 | 16.0 | 59 | 38.9 | 7.0 |
|  | Transverse | 1,220 | 1,120 | 17.0 | 61 | 38.5 |  |
| Example 3 | Longitudinal | 1,190 | 1,070 | 16.5 | 59 | 38.4 | 7.0 |
|  | Transverse | 1,200 | 1,100 | 16.0 | 60 | 38.0 |  |
| Example 4 | Longitudinal | 1,150 | 1,050 | 16.5 | 62 | 38.3 | 7.5 |
|  | Transverse | 1,210 | 1,110 | 16.0 | 61 | 38.6 |  |
| Example 5 | Longitudinal | 1,100 | 1,030 | 16.5 | 64 | 38.1 | 7.0 |
|  | Transverse | 1,170 | 1,050 | 16.0 | 62 | 38.4 |  |
| Comparative Example 1 | Longitudinal | 1,110 | 1,020 | 14.0 | 58 | 38.1 | 4.0 (mixed grain) |
|  | Transverse | 1,110 | 1,010 | 10.0 | 57 | 38.2 |  |
| Comparative Example 2 | Longitudinal | 1,280 | 1,190 | 13.0 | 52 | 40.2 | 6.5 |
|  | Transverse | 1,290 | 1,180 | 12.0 | 46 | 40.1 |  |
| Technique indexes | Longitudinal | ≥1,100 | ≥1,000 | ≥15 | ≥55 | 36-39 | ≥6 |
|  | Transverse | ≥1,100 | ≥1,000 | ≥12 | ≥50 | 36-39 |  |

It can be seen from Table 1 that the high-strength stainless steel rotor prepared by the method of the present disclosure has excellent mechanical properties: a tensile intensity $R_m$ of not less than 1,100 MPa, a yield intensity $R_{p0.2}$ of not less than 1,000 MPa, an elongation after fracture A of not less than 15%, a section shrinkage Z of not less than 55% and a hardness of not less than 36 HRC. The mechanical properties meet the standard requirements with very small differences between horizontal and longitudinal performances of the rotor, thereby meeting the design and use requirements.

Figure 3:
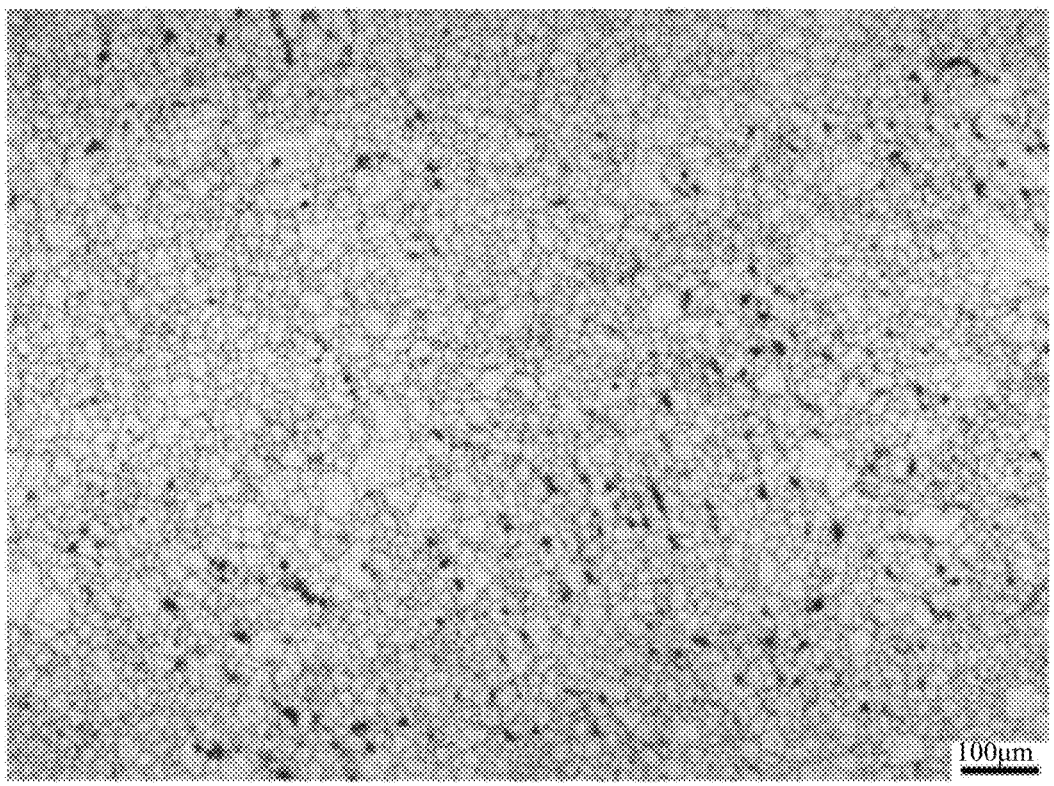
FIG. 3 shows the grain size of the core of the high-speed rotor in Example 1.
Figure 4:
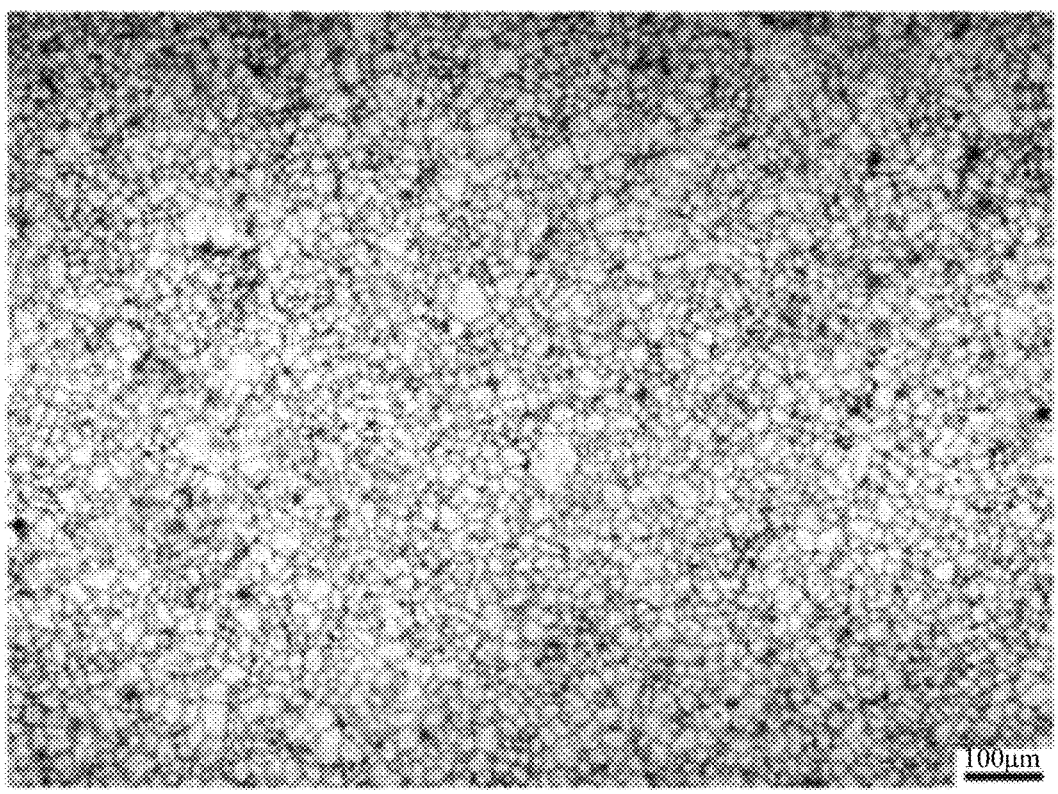
FIG. 4 shows the grain size of the side of the high-speed rotor in Example 1.

FIG. 3 and FIG. 4 show austenite grain morphologies of the core and edge of the high-speed rotor prepared in Example 1, respectively. The two austenites have a similar grain size, an average grain size of level 6.5-7.0, and structures at different positions of the high-speed rotor are almost the same, indicating that the preparation method of the present disclosure allows obtaining a more uniform structure.

Figure 6:
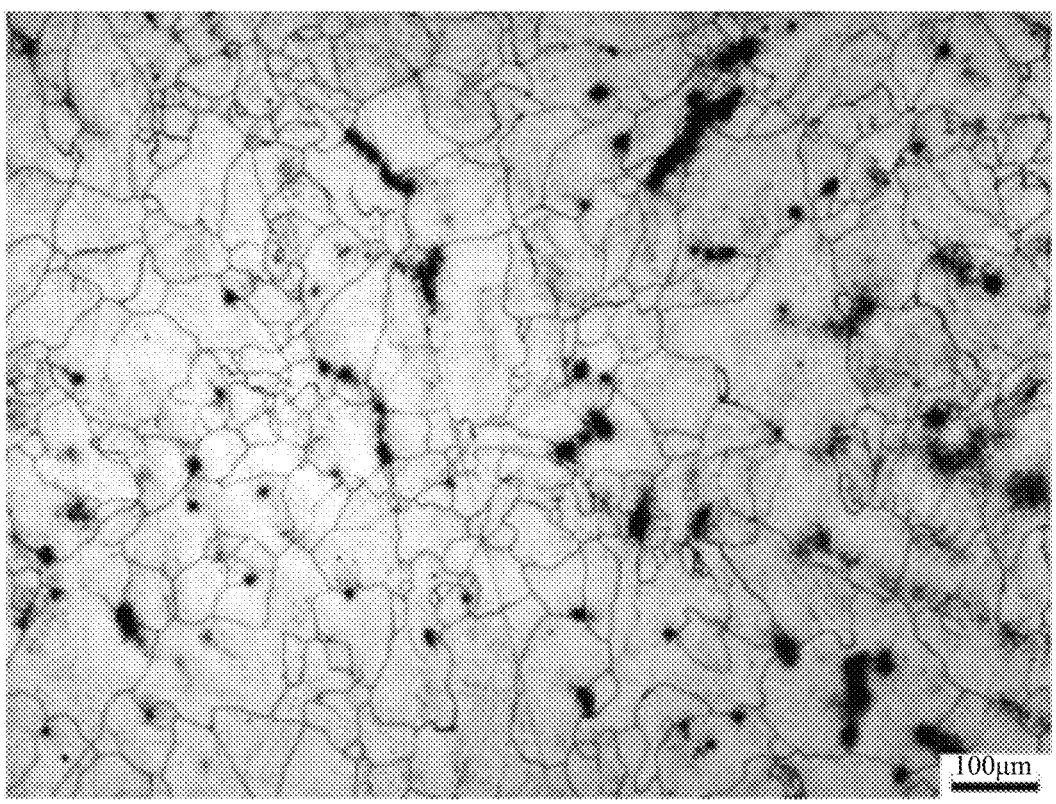
FIG. 6 shows the grain size of the side of the high-speed rotor in Comparative Example 1.

FIG. 5 and FIG. 6 show austenite grain morphologies of the core and edge of Comparative Example 1, respectively. Due to poor forging ratio control, there are mixed grains and many coarse grains, and the elongation decreases significantly, resulting in that the performance cannot meet the index requirements, thereby affecting the performance of the rotor.

In Comparative Example 2, the aging treatment is conducted at a temperature of 540° C. for 4 h; although intensity has been greatly improved, the elongation and the section shrinkage are significantly reduced, resulting in that the performance cannot meet the index requirements, thereby affecting the performance of the rotor.

In summary, in the method for preparing a high-strength stainless steel high-speed rotor provided by the present disclosure, a high-speed rotor with uniform structure and stable performance is obtained by effectively combining a free forging and a die forging to increase the amount of deformation and forging ratio. The method according to the present disclosure could greatly reduce the processing amount, improve the utilization rate of raw materials, adopt a reasonable thermal treatment to control the structure and reduce the loss of machining tools, thereby resulting in a high-speed rotor with all properties meeting the index requirements. In addition, the prepared high-speed rotor has uniform structure, no obvious difference in transverse and longitudinal mechanical properties and excellent performance, meeting actual service requirements.

The above described are merely specific embodiments of the present disclosure, and the protection scope of the present disclosure is not limited thereto. Any modification or replacement easily conceived by those skilled in the art within the technical scope of the present disclosure should fall within the protection scope of the present disclosure.

What is claimed is:

1. A method for preparing a high-strength stainless steel rotor, the high-strength stainless steel rotor comprising the following element components by mass percentage: C: 0.03-0.050%, Cr: 14.90-15.80%, Ni: 5.00-5.70%, Cu: 2.20-2.80%, (Nb+Ta): 0.35-0.44%, Mo: 0.45-0.54%, V: 0.06-0.10%, Si: 0.20-0.60%, Mn: 0.40-0.80%, P≤0.010%, S≤0.010%, O≤0.003%, and the balance of iron and inevitable impurities, and the method comprising the following steps:

step 1: preparing a rotor stainless steel billet;
step 2: subjecting the rotor stainless steel billet to a first heating and a free forging, and then a first annealing and a surface treatment to obtain a forged billet;
step 3: subjecting the forged billet to a second heating, a die forging, and then a second annealing and a solution treatment to obtain a forging; and
step 4: subjecting the forging to a rough machining, an aging treatment and a finish machining to obtain the high-strength stainless steel rotor,
wherein the die forging is conducted by pressing deformation on the forging billet with a lower die for 5 times, and the 5 times of pressing deformation are conducted as follows:
a first pressing deformation is conducted by pressing the forged billet using an upper die with a pressure of 2,000-3,000 tons;
a second pressing deformation and a third pressing deformation are conducted by pressing the forged billet using the upper die with a pressure of not less than 5,000 tons;
a fourth pressing deformation is conducted by pressing the forged billet with a pressure of 4,500 tons; and
a fifth pressing deformation is conducted by pressing the forged billet with a pressure of 4,000 tons for 30-40 s.

2. The method of claim 1, wherein in step 2, the first heating specifically comprises:
heating a gas furnace to a temperature of 750° C., charging the rotor stainless steel billet into the gas furnace, holding for 1.5-2 h, further heating to a temperature of 1,140-1,170° C. at a heating rate of 200-300° C/h, and holding for 2-3 h.

3. The method of claim 1, wherein in step 2, the free forging comprises two upsettings and one drawing out, and is specifically conducted as follows:
subjecting the rotor stainless steel billet to a first upsetting to a diameter φ of 440-460 mm, a drawing out to a diameter φ of 350-380 mm, and then a second upsetting to a diameter φ of 440-460 mm, in which the free forging has an initial forging temperature of 1,140-1,170° C. and a finish forging temperature of not less than 900° C.; and
cooling the rotor stainless steel billet after the free forging in heap to a temperature of 300 ° C., dispersing and air-cooling to ambient temperature.

4. The method of claim 1, wherein in step 2, the first annealing specifically comprises:
placing the rotor stainless steel billet after the free forging into a resistance furnace, heating to a temperature of 640-660° C., holding for 12-20 h, and cooling to ambient temperature along with the furnace.

5. The method of claim 1, wherein in step 3, the second heating specifically comprises:
heating a gas furnace to a temperature of 750° C., charging the forged billet into the gas furnace, holding for 1.5-3 h, further heating to a temperature of 1,120-1,150° C. at a heating rate of 100-150° C/h, and holding for 1-2 h.

6. The method of claim 1, wherein in step 3, the die forging specifically comprises:
placing the forged billet after the second heating into a die forging machine for the die forging with an initial forging temperature of 1120-1140° C. and a finish forging temperature of not less than 900° C.; and
air-cooling the forged billet after the die forging to ambient temperature.

7. The method of claim 1, wherein after the die forging, the obtained forged billet has a thickness pressed from 280 mm to 100-120 mm and a forging ratio of not less than 2.

8. The method of claim 1, wherein in step 3, the second annealing specifically comprises:
placing the forged billet after the die forging into a resistance furnace, heating to a temperature of 640-660° C., holding for 25-30 h, and cooling to ambient temperature along with the furnace.

9. The method of claim 1, wherein in step 3, the solution treatment specifically comprises:
placing the forged billet after the second annealing into a resistance furnace, heating to a temperature of 1,035-1,045° C., holding for 1-1.5 h, and air-cooling to a temperature of not more than 32° C. to obtain the forging.

10. The method of claim 1, wherein in step 4, the aging treatment specifically comprises:

placing the forging after the rough machining into a resistance furnace, heating to a temperature of 550-560° C., holding for 4-4.5 h, and air-cooling to ambient temperature.

11. The method of claim 1, wherein the high-strength stainless steel rotor obtained after the finish machining has a surface roughness reaching Ra1.6.

12. The method of claim 1, wherein the high-strength stainless steel rotor comprises the following element components by mass percentage: C: 0.043%, Cr: 15.4%, Ni: 5.35%, Cu: 2.52%, (Nb+Ta): 0.41%, Mo: 0.53%, V: 0.08%, Si: 0.25%, Mn: 0.46%, P: 0.005%, S≤0.010%, O≤0.003%, and the balance of iron and inevitable impurities.

13. The method of claim 1, wherein in step 1, the rotor stainless steel billet has a length of 450-480 mm and a diameter φ of 350 mm.

14. The method of claim 13, wherein in step 2, the free forging comprises two upsettings and one drawing out, and is specifically conducted as follows:
  subjecting the rotor stainless steel billet to a first upsetting to a diameter φ of 440-460 mm, a drawing out to a diameter φ of 350-380 mm, and then a second upsetting to a diameter φ of 440-460 mm, in which the free forging has an initial forging temperature of 1,140-1,170° C. and a finish forging temperature of not less than 900° C.; and
  cooling the rotor stainless steel billet after the free forging in heap to a temperature of 300 ° C., dispersing and air-cooling to ambient temperature.

* * * * *